Oct. 26, 1971 G. WILHELM 3,614,908
REMOVABLE UNITARY ACTION FOR A FIREARM
Filed Oct. 7, 1968 3 Sheets-Sheet 1

INVENTOR.
Gary Wilhelm
BY
Chester Mueller
Atty

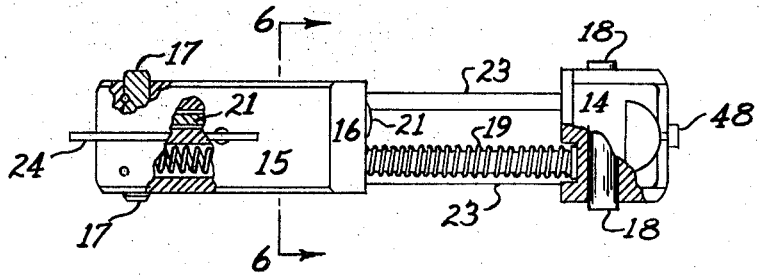
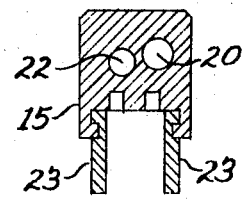
Fig. 5          Fig. 6
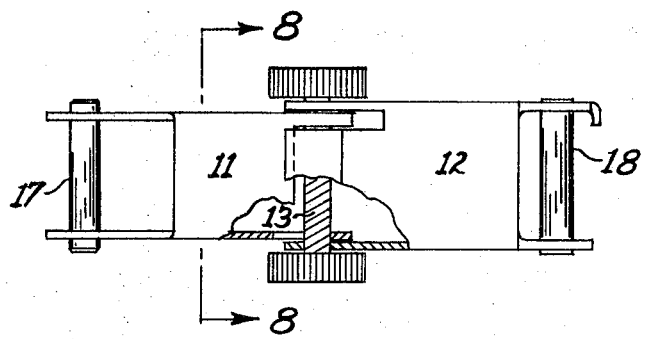
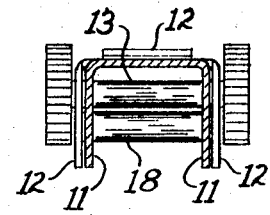
Fig. 7          Fig. 8
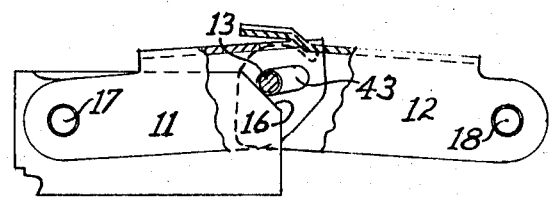
Fig. 10
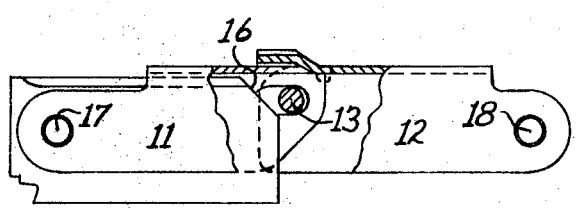
Fig. 9

Oct. 26, 1971 G. WILHELM 3,614,908

REMOVABLE UNITARY ACTION FOR A FIREARM

Filed Oct. 7, 1968 3 Sheets-Sheet 3

INVENTOR.
Gary Wilhelm
BY Chester Mueller
Atty

United States Patent Office 3,614,908
Patented Oct. 26, 1971

3,614,908
REMOVABLE UNITARY ACTION FOR A FIREARM
Gary Wilhelm, Hamden, Conn., assignor to Stoeger Arms Corporation, South Hackensack Township, Bergen County, N.J.
Filed Oct. 7, 1968, Ser. No. 766,380
Int. Cl. F41c *19/00*
U.S. Cl. 89—132                                     5 Claims

ABSTRACT OF THE DISCLOSURE

Shown is a toggle action recoil operated semiautomatic pistol whose action as a unitary assembly is removably secured in the hollow frame of the pistol by a pin, a spring loaded plunger and a set screw.

---

This invention seeks the following objects for a firearm:

in a toggle action recoil operated self-loading pistol the appearance and feel of the historically famous pistol patented by Georg Luger with a design adapted to function for both large and small caliber ammunition;
a firearm with a removable unitary action assembly;
a firearm whose bore may be easily cleaned from the breech end;
an action readily accessible for inspection, cleaning and lubricating;
an improved sear mechanism to provide a reliable and crisp trigger pull;
a positive safety mechanism when the weapon is cocked;
economy in materials and manufacturing processes; and
an action design that permits production of various models and calibers from common basic parts and components.

Other objects will appear from the description which follows.

Figure 1:
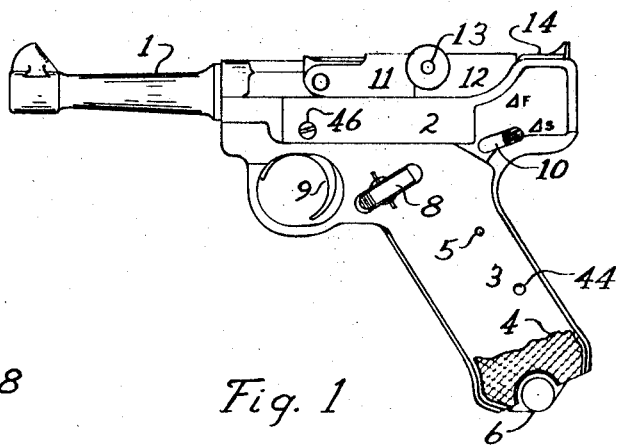
Figure 2:
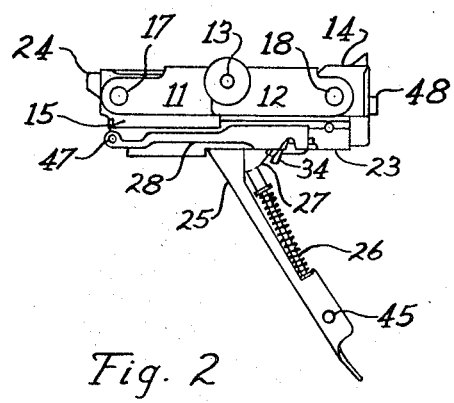
Figure 19:
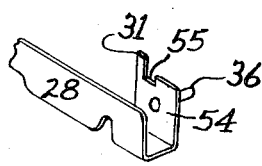
Figure 4:
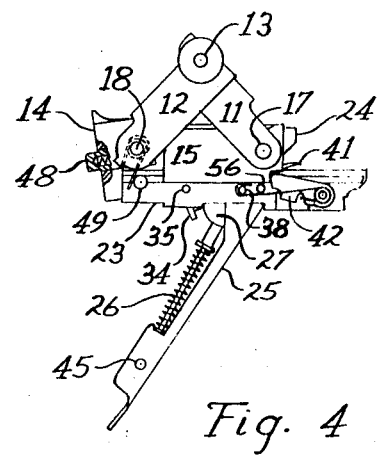
Figure 3:
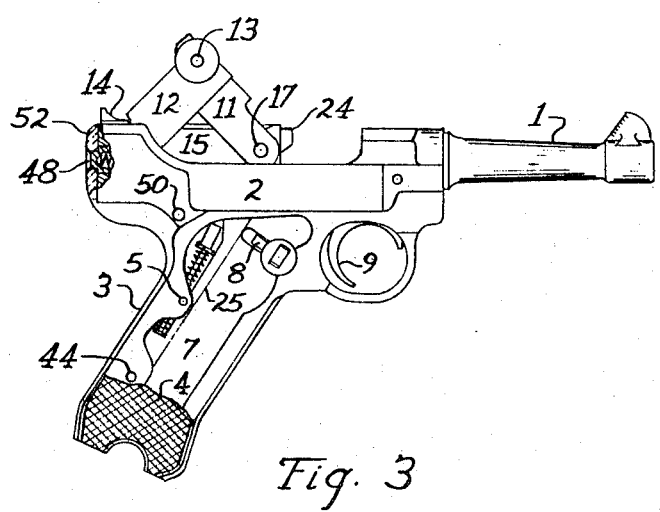
Figure 11:
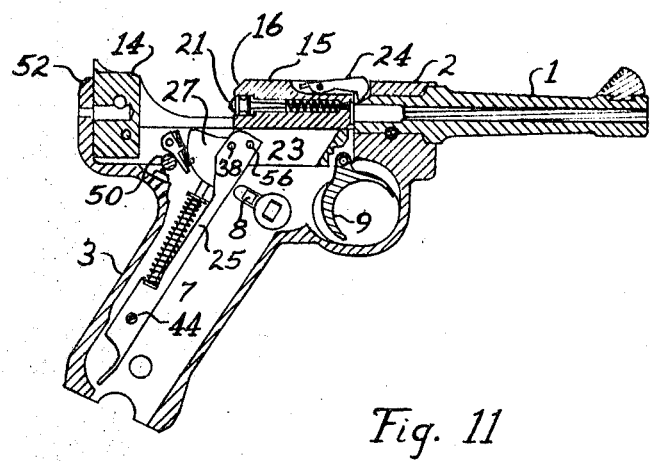
Figure 12:
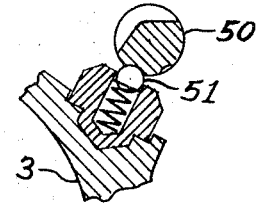
Figure 15:
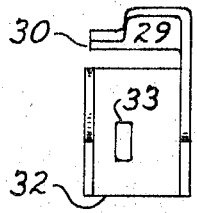
Figure 13:
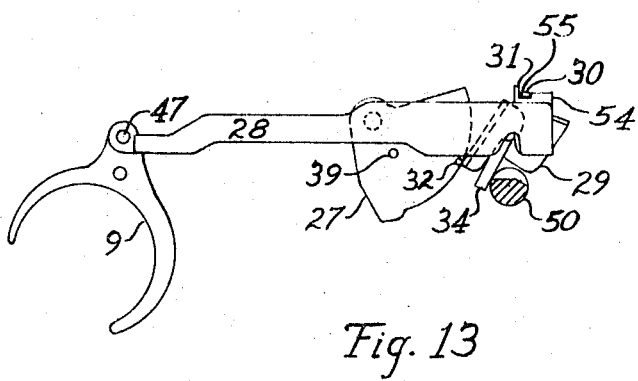
Figure 16:
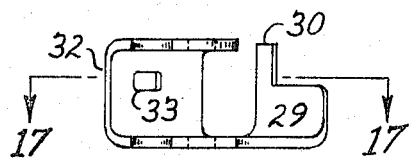
Figure 14:
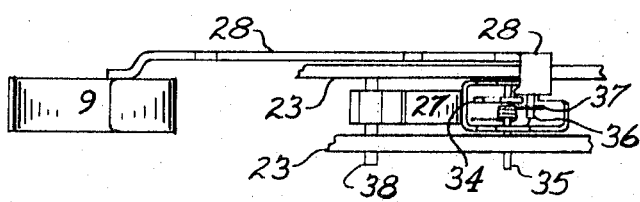
Figure 17:
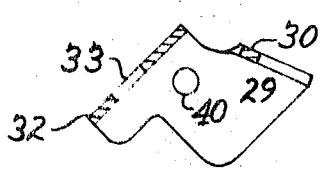
Figure 18:
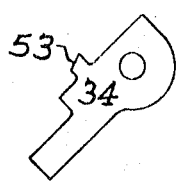

One embodiment of this invention is shown in the accompanying drawings in which:

FIG. 1 is a left side elevational view of a toggle action recoil operated self loading pistol with breech closed, the grip panel being shown in part;
FIG. 2 is a left side elevational view of the unitary action assembly removed from the pistol of FIG. 1;
FIG. 3 is a right side elevational view of the pistol of FIG. 1, less magazine, with breech open and a portion at the rear cut away;
FIG. 4 is a right side elevational view of the unitary action assembly removed from the pistol of FIG. 3 with a portion of the rear cut away;
FIG. 5 is a top view of the bolt and bolt block, cut away in part, mounted on boltways;
FIG. 6 is a section taken on line 6—6 of FIG. 5;
FIG. 7 is a top view of only the toggle linkage, partly cut away;
FIG. 8 is a section taken on line 8—8 of FIG. 7;
FIG. 9 is a side elevational view, partly in section, of the toggle linkage assembled to the bolt with the bolt in closed position;
FIG. 10 is the illustration of FIG. 9 with the toggle arms beginning to fold;
FIG. 11 is the view of FIG. 3 partially sectionalized, less the toggle linkage and plunger connection between the bolt block and the frame;
FIG. 12 is an enlarged sectional detail of the safety lever shaft shown in FIG. 11;
FIG. 13 is a left side elevational view of the interrelation between the trigger, sear bar, sear, hammer, safety shoe and the safety lever shaft;
FIG. 14 is a bottom view of FIG. 13 with the addition of a portion of the boltways within which the hammer and sear are shown pivotally mounted;
FIG. 15 is a rear end view of the sear;
FIG. 16 is a bottom view of the sear;
FIG. 17 is a section taken on line 17—17 of FIG. 16;
FIG. 18 is a left side elevational view of the safety shoe;
FIG. 19 is a fragmentary perspective view of the sear connecting end of the sear bar.

Referring to the figures in which the same reference numeral identifies the same or a similar part, the outward appearance of the assembled pistol is best shown in FIGS. 1 and 3.

Barrel 1 is fixed to frame 2, the grip 3 of which is covered by grip panels 4, removably secured thereto by screws 5. Cartridge magazine 6 seats within magazine chamber 7 of frame 2 in grip 3. Magazine catch 8 which is the subject of my co-pending application for a patent for a Pistol Magazine Catch, filed June 25, 1968 is secured in the left wall of grip 3. Trigger 9 and safety lever 10 are conventional in outward appearance. On top of the pistol are front toggle arm 11 and rear toggle arm 12 linked together by toggle link pin 13 capped at each end by finger grips. Outwardly exposed is bolt block 14 upon which a fixed rear sight is mounted.

A cavity extends from the butt of the firearm upward through grip 3 opening out at the top of frame 2 between the breech and upstanding abutment 52 at the rear of the frame. It is within this cavity that the unitary action assembly shown in FIGS. 2 and 4 is removably secured.

The action assembly is supported on a pair of parallel, spaced longitudinal members herein termed boltways 23, joined at their front ends to form a rigid elongated U shaped chassis the front end of which rests against the matching internal surface of frame 2. Limitedly pivotal on transverse guide pin 56 therein and depending therefrom is rearwardly channel shaped rear magazine guide 25 which, when the assembly is seated in frame 2, completes the definition of magazine chamber 7. Projecting from and integral with the upper end of guide 25 is ejector 41 (FIG. 4). Spring biased hammer strut 26 is borne at its lower end in rear magazine guide 25 and at its upper end is pivotally attached to hammer 27 by strut pin 39.

Hammer 27 mounted between the side walls of rear magazine guide 25 is pivoted on hammer pin 38 which is supported by and between boltways 23. Hammer pin 38 passes through enlarged holes in the embracing side walls of the channel shaped rear magazine guide 25 before becoming journalled in boltways 23. These enlarged holes permit, and limit, the pivoting of guide 25 on its guide pin 56.

Coaxially and pivotally mounted on sear pin 35 are sear 29 and safety shoe 34. Sear pin 35 is supported by and between boltways 23, parallel to hammer pin 38 (FIG. 14).

Bolt 15 is slidably mounted on boltways 23 as shown in FIGS. 5 and 6. Bolt block 14 is pivotal on pin 49, between boltways 23 closing the open end of the U shaped chassis formed by boltways 23. Recoil spring 19 seated in well 20 in bolt 15 and in an opposing well in bolt block 14 yieldably urges the bolt against the breech of the pistol. In addition to recoil spring 19, bolt 15 houses firing pin 21, in hole 22, and extractor 24. Bevel 16 is formed on the rear upper shoulder of bolt 15 across its full width.

Bolt block 14 houses, in a recess in its rear surface coaxially with the bore of the barrel, spring loaded plunger 48.

Shown also in FIG. 5 are toggle pins 17 and 18 to which the toggle arms, not shown in this figure, are attached.

Bolt stop 42 is mounted on the outside of right boltway 23 under spring action (FIG. 4). Its function is to hold bolt 15 in open position when the bolt is open without a cartridge being present in magazine 6 ready for insertion into the chamber.

Embracing bolt 15 and bolt block 14 are inverted channel shaped toggle arms 11 and 12. Front toggle arm 11 pivots on toggle pin 17, rear toggle arm pivots on toggle pin 18 with a portion of its forward end overlapping part of the front toggle arm when the arms are extended. Toggle link pin 13 joins the arms. Pins 17 and 18 pass through the walls of the arms as shown in FIGS. 7 and 8. Pin 13 is fixed to rear toggle arm 12 but is slidable in slots 43 of front toggle arm 11.

Astride the bottom edge of left boltway 23 is the turned-in rear end of sear bar 28 (FIG. 19), connected to sear 29 and held to the assembly as hereinafter described.

The foregoing described assembly is removably secured in frame 2 by frame link pin 44 passing through holes 45 in the side walls of rear magazine guide 25 and in corresponding holes in both side walls of grip 3, and by plunger 48 projecting into a hole in abutment 52 of frame 2. Grip panels 4, when mounted in place, enclose frame link pin 44 and prevent its dislodgement. The assembly is operably connected to trigger 9 by sear bar 28 the front end of which encircles stud 47 projecting laterally from trigger 9. Set screw 46 threaded through frame 2 opposite stud 47, prevents disengagement of the sear bar from the trigger.

To remove the assembly from the pistol, grip panels 4 and set screw 46 are removed from frame 2. Exposed frame link pin 44 is then pushed out of the frame and plunger 48 pressed inward to clear abutment 52 thus permitting the assembly to be lifted out of frame 2. By reversing these steps the assembly may be re-installed in the frame.

When the assembly is out of frame 2, bolt block 14 pivots limitedly upward on its pin 49 under the urging of recoil spring 19 (FIG. 4). Rear magazine guide 25 is also slightly pivoted under urging of the spring of hammer strut 26. The flexibility of these two members although not necessary to this invention facilitates the disassembly and assembly of the action to frame 2.

With the assembly out of the frame the hole in abutment 52 being coaxial with the bore of barrel 1 enables cleaning of the bore to be readily accomplished from the breech end of the barrel. Additionally the exposed action assembly is accessible for inspection, cleaning and lubrication.

Turning to the sear and safety, FIG. 11 et seq. disclose the details of construction and connection.

Sear 29, pivotable on sear pin 35 that passes through holes 40 in the side walls of its channel shaped body has one of such walls extended and turned inward at right angles to provide a sear engaging finger 30 projecting therefrom parallel to sear pin 35. Finger 30 is adapted to seat in notch 55 behind finger 31 of sear bar 28 so that pressure against finger 30 will pivot sear 29 about sear pin 35 (FIG. 13). Sear 29 is located to be engageable in the midsection of its leading edge 32 with the notch in hammer 27.

Mounted pivotally on sear pin 35 between the side walls of the body of sear 29 is safety shoe 34. It is held in vertical alignment with hammer 27 by the seating of its nose 53 in loose fit engagement within slot 30 of sear 29.

Sear bar 28 is directly connected to sear 29 although the sear lies between boltways 23 and the length of the sear bar lies outside as shown and described herein. Sear bar 28 at its rear end is U shaped at right angles to its length and this portion straddles the bottom edge of left boltway 23, the outer upturned wall 54 standing between boltways 23 and parallel thereto. Extending outward from upturned wall 54 and parallel to sear pin 35 is stud 36. Mounted on sear pin 35 is double torsion spring 37 one end of which bears against sear 29 yieldably urging it in contact with hammer 27, the other end bearing on stud 36 to bring trigger 9 into an operable position by yieldably urging sear 28 rearward and thus the lower end of trigger 9 forward. Spring 37 serves to retain sear bar 28 in the assembly when the assembly is out of frame 2.

Co-planar with upturned wall 54 of sear bar 28 is projecting finger 31. Lying behind finger 31, in notch 55 of upturned wall 54, is sear finger 30. When pressure on trigger 9 moves sear bar 28 forward, the sear bar acting on finger 30 causes sear 29 to pivot downward out of engagement with the notch in hammer 27 (FIGS. 13 and 14). The rigidity and stability of a channel shaped sear pivoted on a pin passing through the side walls of the channel with the sear bar acting upon it between the channel walls is readily apparent.

Safety lever 10 has shaft 50 extending transversely through a pair of holes in the frame in position to selectively act with its round or flat peripheral surface upon the rear edge of safety shoe 34 in response to rotation of the safety lever. As seen in FIGS. 11 and 12 when the pistol is cocked and the safety lever 10 rotated to bring the rounded portion of shaft 50 to bear on safety shoe 34 it will hold the safety shoe against the lower edge of sear 29 thus locking the sear in the hammer notch. When a flat surface of shaft 50 is rotated opposite safety shoe 34 the safety shoe will no longer restrain sear 29. The safety shoe will then be free to move backward when the sear pivots but its nose 53 in slot 33 will continue to hold the safety shoe in vertical alignment with hammer 27. To releasably hold shaft 50 in either fire ("F") or safe ("S") position a conventional spring loaded ball 51 in cooperation with detents on shaft 50 is employed. With this principle a safety lever for left hand shooters may be appropriately shaped and inserted from the right side of the pistol in the same pair of holes in frame 2.

The operation of the pistol, after inserting a loaded magazine into the grip begins with placing a cartridge from the magazine into the chamber of the barrel. This is done in the manner common to toggle action firearms by raising the toggle arms, by the finger grips, rearward and upward to a folded position as in FIG. 3 and then releasing the finger grips. The top cartridge in the magazine will be fully seated upon return of the bolt to the closed position shown in FIGS. 2 and 9. With the safety on "F," by squeezing trigger 9 the cartridge is fired and bolt 15 begins its recoil from the breech. Before it starts back, toggle link pin 13 lies in the rear of slots 43 in front toggle arm 11 as shown in FIG. 9. As bolt 15 moves backward it carries front toggle arm 11 with it the length of slots 43 and until bevel 16 strikes toggle link pin 13 camming it upward together with both toggle arms (FIG. 10). The arms continue to fold upward, the front toggle arm 11 being simultaneously carried rearward while rear toggle arm 12 being pivoted in stationary bolt block 14 merely pivots upward. At the end of recoil the parts are restored by the counter action of the recoil spring 19.

Many changes and modifications may be made in the construction of the firearm described within the scope of this invention. It is also apparent that the invention shown and described may be applied to carbines, rifles and other semiautomatic firearms and by showing only one application herein it is not thereby intended to limit the scope thereof.

What I claim is:

1. In a recoil operated pistol the combination of
   a barrel,
   a frame to which the barrel is fixed,
   a cavity in the frame opening outward in the butt of the grip portion of the frame and at the top of the frame between the breech end of the barrel and an upwardly extending abutment at the rear of the frame,
   a unitary assembly of the action removably secured in the cavity of the frame with a depending member in the grip portion of the frame, action assembly securing means comprising
- a hole in the depending member of the assembly in registry with a hole in each side of the frame,
- a pin in slidable fit in said holes,
- a hole in the upstanding abutment at the rear of the frame co-axial with the bore of the barrel,
- a spring biased plunger seated in a recess in the rear surface of the assembly and projecting into the hole in the said abutment, and
- a trigger pivotally mounted in the frame adapted to be operably connected with the unitary assembly.

2. In a recoil operated pistol the combination of
a barrel,
a frame to which the barrel is fixed,
a cavity in the frame opening outward in the butt of the grip portion of the frame and at the top of the frame between the breech end of the barrel and an upwardly extending abutment at the rear of the frame,
a trigger pivotally mounted in the frame adapted to be operably connected with
a unitary assembly of the action removably secured in the cavity of the frame, such unitary action assembly comprising
- a chassis consisting of a pair of parallel, spaced, longitudinal members joined at their breech end, co-extensive with and seated within the top opening of the cavity in the frame below and parallel to the axis of the bore of the barrel,
- a depending member fixed to the chassis and defining the rear wall of a magazine chamber in the grip portion of the frame,
- a spring biased hammer strut mounted on the depending member,
- a hammer pivotally mounted within the chassis and operably connected to the hammer strut,
- a sear pivotally mounted within the chassis, with spring means yieldably urging the sear in engagement with the hammer, nected with the trigger,
- a sear bar extending longitudinally along the chassis engaged at its rearward end with the sear and adapted at its forward end to be operably connected with the trigger,
- a spring biased firing pin
- a breech closing mechanism comprising
  - a breech bolt slidably mounted on the chassis adapted to close the breech of the barrel,
  - a bolt block fixed to the chassis and adapted to bear against the upwardly extending abutment at the rear of the frame,
  - spring means disposed between the bolt and bolt block yieldably urging the bolt against the breech of the barrel,
  - a toggle joint with the outer end of the front arm pivotally connected to the bolt and with the outer end of the rear arm pivotally connected to the bolt block, the inner ends of both arms being pivotally connected with each other.

3. In a recoil operated pistol the combination of:
a barrel,
a frame to which the barrel is fixed,
a cavity in the frame opening outward in the butt of the grip portion of the frame and at the top of the frame between the breech end of the barrel and an upwardly extending abutment at the rear of the frame,
a trigger pivotally mounted in the frame adapted to be operably connected with
a unitary assembly of the action removably secured in the cavity of the frame, such unitary action assembly comprising:
- a chassis consisting of a pair of parallel, spaced, longitudinal members jointed at their breech end, co-extensive with and seated within the top opening of the cavity in the frame below and parallel to the axis of the bore of the barrel,
- a depending member limitedly pivotal in the chassis and defining the rear wall of a magazine chamber in the grip portion of the frame,
- a spring biased hammer strut mounted on the depending member,
- a hammer pivotally mounted within the chassis and operably connected to the hammer strut,
- a sear pivotally mounted within the chassis, with spring means yieldably urging the sear in engagement with the hammer,
- a sear bar extending longitudinally along the chassis engaged at its rearward end with the sear and adapted at its forward end to be operably connected with the trigger,
- a spring biased firing pin,
- a breech closing mechanism comprising:
  - a breech bolt slidably mounted on the chassis adapted to close the breech of the barrel,
  - a bolt block limitedly pivotal on the chassis and adapted to bear against the upwardly extending abutment at the rear of the frame,
  - spring means disposed between the bolt and bolt block yieldably urging the bolt against the breech of the barrel,
  - a toggle joint with the outer end of the front arm pivotally connected to the bolt and with the outer end of the rear arm pivotally connected to the bolt block, the inner ends of both arms being pivotally connected with each other.

4. In a recoil operated pistol the combination of:
a barrel,
a frame to which the barrel is fixed,
a cavity in the frame opening outward in the butt of the grip portion of the frame and at the top of the frame between the breech end of the barrel and an upwardly extending abutment at the rear of the frame,
a trigger pivotally mounted in the frame adapted to be operably connected with the unitary assembly;
a unitary assembly of the action removably secured in the cavity of the frame, such unitary action assembly comprising:
- a chassis consisting of a pair of parallel, spaced, longitudinal members jointed at their breech end, co-extensive with and seated within the top opening of the cavity in the frame below and parallel to the axis of the bore of the barrel,
- a depending member fixed to the chassis and defining the rear wall of a magazine chamber in the grip portion of the frame,
- a spring biased hammer strut mounted on the depending member,
- a hammer pivotally mounted within the chassis and operably connected to the hammer strut,
- a sear pivotally mounted within the chassis, with spring means yieldably urging the sear in engagement with the hammer,
- a sear bar extending longitudinally along the chassis engaged at its rearward end with the sear and adapted at its forward end to be operably connected with the trigger,
- a spring biased firing pin,
- a breech closing mechanism comprising:
  - a breech bolt slidably mounted on the chassis adapted to close the breech of the barrel, and having a bevelled top rear shoulder, a bolt block limitedly pivotal on the chassis and adapted to bear against the upwardly extending abutment at the rear of the frame, spring means disposed between the bolt and bolt block yieldably urging the bolt against the breech of the barrel, a toggle link of two channel shaped arms with the end of one overlapping an end of the other, inverted over the bolt and bolt block with the front arm surrounding the bolt with its outer end pivotally connected thereto and the rear arm surrounding the bolt block with its outer end pivotally connected thereto, the arms of the toggle link joined where they overlap by a pivot pin fixed in the side wall of the rear arm and passing through two opposing longitudinal slots in the side walls of the front arm, the said pivot pin when the arms of the toggle link are straightened lying in the rear portion of the slots and in juxtaposition to the lower slope of the bevelled shoulder of the bolt.

5. In a recoil operated pistol the combination of a barrel, a frame to which the barrel is fixed, a cavity in the frame opening outward in the butt of the grip portion of the frame and at the top of the frame between the breech end of the barrel and an upwardly extending abutment at the rear of the frame, a trigger pivotally mounted in the frame adapted to be operably connected with the unitary assembly, a unitary assembly of the action removably secured in the cavity of the frame, such unitary action assembly comprising a chassis consisting of a pair of parallel, spaced, longitudinal members joined at their breech end, co-extensive with and seated within the top opening of the cavity in the frame below and parallel to the axis of the bore of the barrel, a depending member fixed to the chassis and defining the rear wall of a magazine chamber in the grip portion of the frame, a spring biased hammer strut mounted on the depending member, a hammer pivotally mounted within the chassis and operably connected to the hammer strut, a sear pivotally mounted within the chassis, with spring means yieldably urging the sear in engagement with the hammer, a sear bar extending longitudinally along the chassis engaged at its rearward end with the sear and adapted at its forward end to be operably connected with the trigger, a sprig biased firing pin a breech closing mechanism comprising a breech bolt slidably mounted on the chassis, adapted to close the breech of the barrel, a bolt block limitedly pivotal on the chassis and adapted to bear against the upwardly extending abutment at the rear of the frame, spring means disposed between the bolt and bolt block yieldably urging the bolt against the breech of the barrel, a toggle joint with the outer end of the front arm pivotally connected to the bolt and with the outer end of the rear arm pivotally connected to the bolt block, the inner ends of both arms being pivotally connected with each other.

means for securing the unitary action assembly in the frame comprising a hole in the depending magazine chamber rear wall defining member in registry with a hole in each side of the frame, a pin slidable fit in said holes, a hole in the upwardly extending abutment at the rear of the frame co-axial with the bore of the barrel, a spring biased plunger seated in a recess in the rear surface of the bolt block and projecting into the hole in the said abutment, a set screw threaded through a hole in the side wall of the frame and in contact with the sear bar whereby the sear bar is held in pivotal connection with the trigger.

References Cited

UNITED STATES PATENTS

| | | | |
|---|---|---|---|
| 1,866,722 | 7/1932 | Pedersen | 89—189 X |
| 2,037,647 | 4/1936 | White | 89—132 |
| 2,139,203 | 12/1938 | Petter | 89—132 |

SAMUEL FEINBERG, Primary Examiner

S. C. BENTLEY, Assistant Examiner